Jan. 27. 1925.  
W. R. GORDON  
MOTOR VEHICLE  
Filed Oct. 25, 1920  
1,524,127  
2 Sheets-Sheet 1
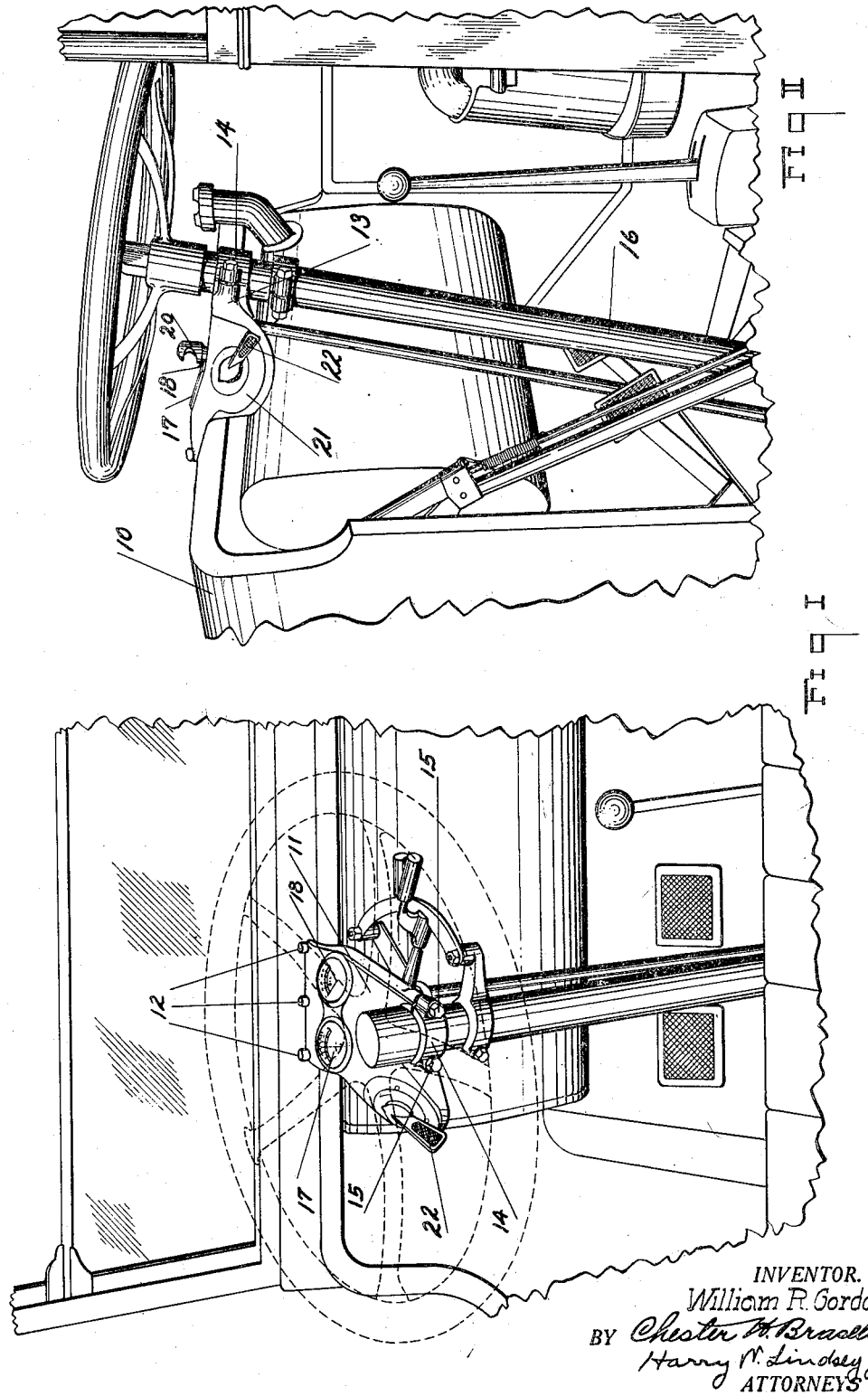
INVENTOR.  
William R. Gordon  
BY Chester W. Braselton  
Harry N. Lindsey Jr.  
ATTORNEYS Jan. 27, 1925.
W. R. GORDON
MOTOR VEHICLE
Filed Oct. 25, 1920　　2 Sheets-Sheet 2
1,524,127
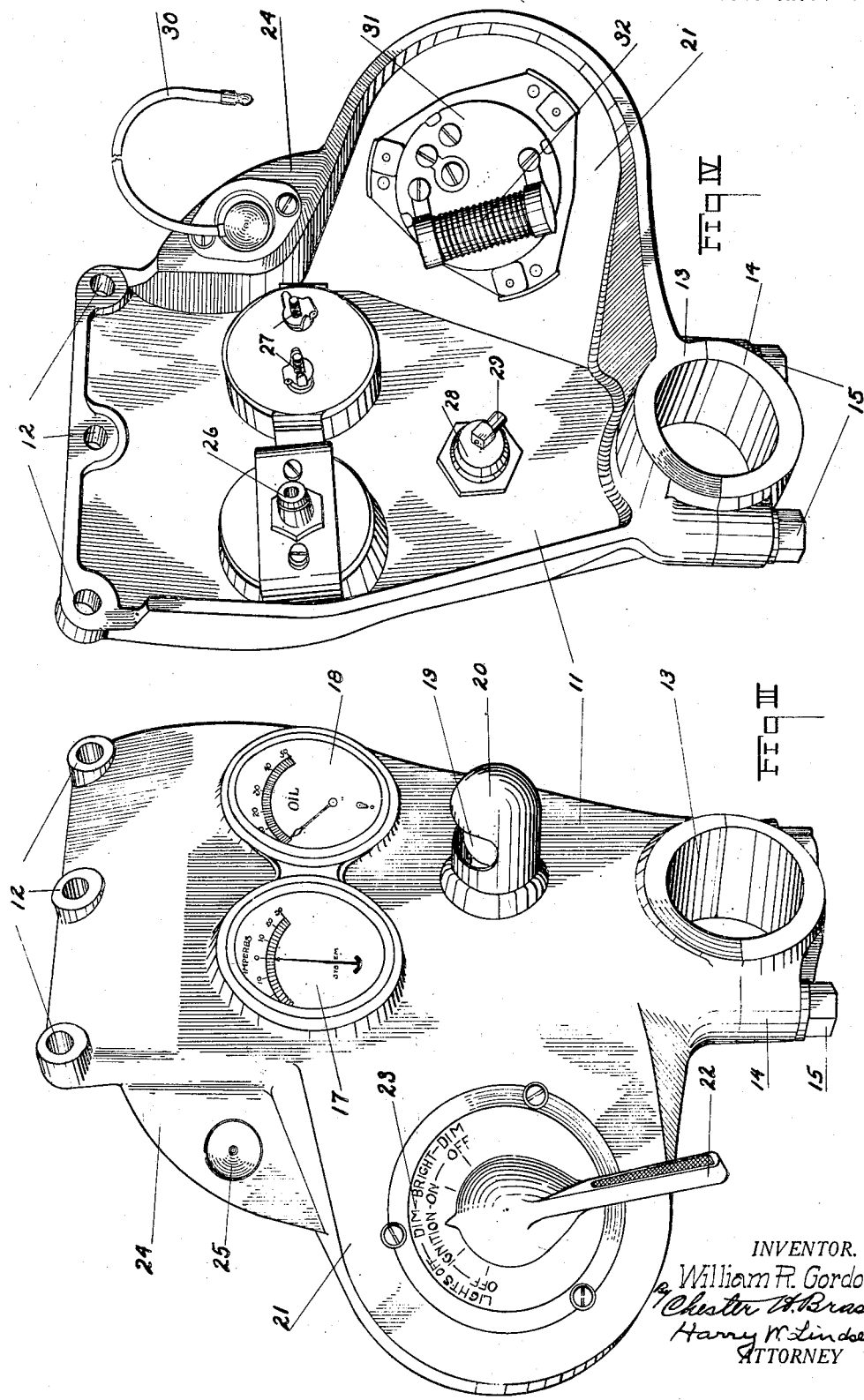
INVENTOR.
William R. Gordon
Chester H. Brasetta
Harry W. Lindsey Jr.
ATTORNEY Patented Jan. 27, 1925.

1,524,127

UNITED STATES PATENT OFFICE.

WILLIAM R. GORDON, OF TOLEDO, OHIO.

MOTOR VEHICLE.

Application filed October 25, 1920. Serial No. 419,405.

*To all whom it may concern:*

Be it known that I, WILLIAM R. GORDON, a subject of the King of Great Britain, who has declared his intention to become a citizen of the United States, residing at Toledo, in the county of Lucas and State of Ohio, have invented certain new and useful Improvements in Motor Vehicles, of which I declare the following to be a full, clear, and exact description.

This invention relates to improvements in motor vehicles, more particularly with regard to the steering column bracket.

One of the objects of the invention is the utilization of the steering column bracket in such a way as to add to its ordinary functions, those of an instrument board.

A further object of the invention is the location of switches, gauges, instrument lamp, etc., in a compact arrangement directly in front of and readily accessible to the driver of the vehicle.

Other objects, and objects relating to details of construction and economies of manufacture, will appear as I proceed with the description of that embodiment of the invention which, for the purposes of the present application, I have illustrated in the accompanying drawings, in which:

Figure I is a fragmental perspective view of a truck embodying my invention, looking forward from the driver's seat, the position of the steering wheel being indicated by dotted lines only.

Figure II is a side view in perspective.

Figure III is a perspective view of the upper face of the steering column bracket.

Figure IV is a perspective view of the reverse side of the bracket.

Like reference characters refer to similar parts throughout the views.

In the drawings, the numeral 10 represents the cowl of a motor truck to which is bolted the forward edge of a steering column bracket 11 formed with a series of holes 12 for the reception of the fastening bolts. The rear edge of the bracket is so shaped as to form a half collar 13 to which the other half 14 may be secured by means of bolts 15. When the apparatus is assembled the steering post 16 is first received by the half collar 13 and the half collar 14 is thereafter bolted onto the bracket, thus firmly anchoring the upper end of the steering column through the bracket to the cowl.

In the main portion of the bracket 11, slightly behind its line of attachment to the cowl, I mount one or more gauges 17, 18. My invention contemplates the mounting in this position of gauges of any character which it may be found desirable to employ, such for instance as an ammeter, a volt meter, an oil pressure gauge or flow indicator, a mileage indicator, a speedometer, a time indicator or clock, a fuel gauge or the like. Behind such gauges I mount an electric light bulb 19 having a reflector 20 by means of which the dials of the gauges may be illuminated.

To one side of the main portion of the bracket 11, but integral therewith, is an extension 21 preferably inclined downwardly somewhat in order to economize space. Upon this extension I mount an electric switch by means of which the different electric circuits in use on the vehicle may be controlled. The switch handle is shown at 22, and the indications for the guidance of the driver in moving the handle are shown at 23. In the angle between the main portion of the bracket 11 and the extension 21, I prefer to form a web 24 in which I locate an electric socket 25 of any ordinary or special character adapted to receive an electric plug, as for instance the plug on the end of a trouble lamp cord connection, or upon the end of the search light cord connection.

In the embodiment shown in the drawing, the gauge 18 is an oil pressure gauge which has at its rear (see Figure IV) a connector or nipple 26 to which a suitable piece of tubing may be attached for connection with the oil pumping system. The gauge 17 is illustrated as an ammeter and supports on its rear side suitable binding posts 27 to which electric conductors may be secured. The lamp 19 is mounted in an electric socket 28 to which leads a conductor 29 of which a fragment only is illustrated. A conductor 30 is electrically connected with socket 25. The two conductor's 29 and 30 may lead through any desired switch or switches to a source of electric current such as a storage battery or electric generator, but preferably they extend to the switch mounted upon the bracket itself, the rear portion of which is shown at 31 in Figure IV. As illustrated, this switch is adapted to control not only these connections, but also the other electric lamp connections including those of the headlight, and the engine ignition as well. A resistance coil 32 which may be thrown into circuit with the headlights by operation of the handle 22, affords a means for reducing the current through the headlights for the purpose of dimming the latter.

I am aware that the embodiment of my invention shown and described herein is susceptible of various modifications without departing from the spirit thereof, and therefore I desire to claim the invention broadly as well as specifically, as indicated in the appended claim.

Having thus described my invention, what I claim as new and desire to secure by Letters Patent, is:

In a motor vehicle, a cowl, a steering column, and a bracket extending substantially in a horizontal plane and having one end directly connected with the cowl and the other end connected with said steering column to support and brace the same, said bracket being constructed to receive a plurality of instruments adapted to be carried by the bracket in a position to be viewed from a point above the steering wheel.

In testimony whereof I affix my signature.

WILLIAM R. GORDON.